United States Patent [19]
Giannandrea et al.

[11] Patent Number: 5,978,817
[45] Date of Patent: *Nov. 2, 1999

[54] BROWSER HAVING AUTOMATIC URL GENERATION

[75] Inventors: John Giannandrea, Mountain View, Calif.; Eric J. Bina, Champaign, Ill.; Louis J. Montulli, Mountain View, Calif.

[73] Assignee: Netscape Communications Corp., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,227

[22] Filed: Mar. 21, 1997

Related U.S. Application Data

[62] Division of application No. 08/515,189, Aug. 15, 1995, abandoned.

[51] Int. Cl.⁶ .................................................. G06F 11/00
[52] U.S. Cl. ........................................... 707/501; 345/329
[58] Field of Search ..................... 707/501, 513, 707/514, 10, 103, 104; 345/329, 335, 339, 338; 395/200.1, 200.12, 200.16, 200.2

[56] References Cited

U.S. PATENT DOCUMENTS

| | | | |
|---|---|---|---|
| 5,021,989 | 6/1991 | Fujisawa et al. | 707/517 |
| 5,031,121 | 7/1991 | Iwai et al. | 707/515 |
| 5,204,946 | 4/1993 | Shimamura | 707/515 |
| 5,465,326 | 11/1995 | Sawada | 707/523 |
| 5,673,322 | 9/1997 | Pepe et al. | 380/49 |
| 5,696,898 | 12/1997 | Baker et al. | 395/187.01 |
| 5,727,159 | 3/1998 | Kikinis | 395/200.76 |
| 5,732,219 | 3/1998 | Blumer et al. | 395/200.57 |

OTHER PUBLICATIONS

*Using Mosaic*, Que® Corporation, 1994, pp. 281–285.
Baker, "Hypertext Browsing on the Internet", UNIX Review, v12, n9, Sep. 1994 pp. 21–27.
Tannenbaum, "Netscape Surfs the World Wide Web Better Than Mosaic", Network Computing, n601, 1195, p. 44.
"Quark to Unveil New QuarkXPress 2.0", News Release, Jan. 1988, p. 1.
"Netscape Communications Now, Builds on Tradition of Freeware for the Net", Press Release, retrieved from "http://www.mcom.com/newsref/pr/newsreleasel.html", Oct. 1994, pp. 1–2.
"Netscape Navigator 1.1 for Windows", Release Notes, retreived from "http://home:netscape.com/eng/mozilla/1.1/renotes/windows–1.1.html", Mar. 1997, pp. 1–7.
Bishop, "MacDraw Pro losing ground despite enhancements", MacWeek, v6, n28, Aug. 1992, p. 101.
Using Mosaic, QUE® Corporation, 1994, pp. 31–44 and 80–104.

*Primary Examiner*—Stephen S. Hong
*Attorney, Agent, or Firm*—Limbach & Limbach L.L.P.

[57] ABSTRACT

A browser accesses a remote server over a network, where the server has a URL containing a protocol portion and a server portion. The browser includes a user interface for allowing a viewer to type in said server portion. The typed-in server portion is one of a plurality of possible server portions, each possible server portion having a corresponding protocol portion. The protocol portion that corresponds to the typed-in server portion is determined in response to the typed-in server portion. A complete URL is generated by attaching the determined protocol portion to the typed-in server portion. A connection is opened with the remote server using the generated URL.

4 Claims, 6 Drawing Sheets

```
Title>Distributed Image Loading Example<rtitle>
al>Distributed Image Loading Example<end>

One of the major features of ABC is the ability to
retrieve images from sites distributed around the world.
These images can then be combined with a text document retrieved
separately and presented as a single "virtual" document to an
end-user.  This HTML document demonstrates this capability.<p>

This document was fetched from a server in northern California.  However,
this image:
<IMG align=middle src=*http:ww.ncsa.uiuc.edu/demoweb/al-small.gif*>
was obtained from Illinois.    <P>

And this one:   <IMG align=top src=*http://www.su.se/SUlogo.gif*> came from
the University of Stockholm...
```

FIG. 3A

Distributed Image Loading Example

One of the major features of ABC is the ability to retrieve images from sites distributed around the world. These images can then be combined with a text document retrieved separately and presented as a single "virtual" document to an end-user. This HTML document demonstrates this capability.

This document was fetched from a server in northern California. However, this image: 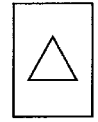

was obtained from Illinois.

And this one: 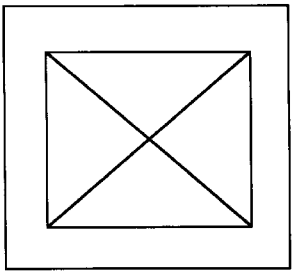 came from the University of Stockholm...

FIG. 3B

BROWSER HAVING AUTOMATIC URL GENERATION

This is a divisional of application Ser. No. 08/515,189, filed Aug. 15, 1995 now abandoned.

FIELD OF THE INVENTION

This invention relates to displaying a document containing text and images on a computer, and more particularly relates to displaying such a document wherein the text and images are retrieved from one or more servers over a computer network such as the Internet.

BACKGROUND OF THE INVENTION

An important use of computers is the transfer of information over a network. Currently, the largest computer network in existence is the Internet, which is a worldwide interconnection of millions of computers, from low end personal computers to high-end mainframes.

The Internet grew out of work funded in the 1960s by the U.S. Defense Department's Advanced Research Projects Agency. For a long time, Internet was used by researchers in universities and national laboratories to share information. As the existence of the Internet became more widely known, many users outside of the academic/research community (e.g., employees of large corporations) started to use Internet to carry electronic mails. In 1989, a wide-area information system know as the World Wide Web ("the Web") was originated at CERN, which is a European collective of high-energy physics researchers. The Web is a wide-area hypermedia information retrieval system aimed to give universal access to a large universe of documents. At that time, the Web was known to and used by the academic/research community only. There was no easily available tool which allows a technically untrained person to access the Web. The most exciting development in Internet is the release of a Web "browser" called Mosaic in 1993. It has a simple but powerful graphic interface. The browser allows a user to retrieve web documents and navigate the Web using simple commands and popular tools such as point-and-click. Because the user does not have to be technically trained and the browser is pleasant to use, it has the potential of opening up the Internet to the masses.

A document designed to be accessed and read over the web is called a web page. Each web page must have an address in a recognized format—the URL, or Uniform Resource Locator—that enables computers all over the world to access it. Each web page has an unique URL. A web page typically contains both text and images. Because image files are large, even when compressed, it could take a long time to retrieve a web page, especially when a voice-quality phone line is used to connect to the Internet. Consequently, it is important to design a browser which is able to reduce the amount of time to display a web page.

Some browsers display a web page on a computer screen only when all the data (i.e., text and images) is received. As a result, the computer screen becomes blank for an unbearable period of time (e.g., many minutes) after a request for the web page is made. Other browsers display the text before the images are received. These browsers may use icons at appropriate places on a web page to indicate that images would appear at these places later. When the images are received, the page needs to be reformatted because the sizes of the icons are different from the sizes of the images. The reformatting process produces a sudden and annoying change on the computer screen.

In order to encourage more users to use the Web, it is desirable to reduce the time a web page appears on a computer screen and to display web pages in a more appealing fashion.

SUMMARY OF THE INVENTION

The present invention is directed to a web browser that can display web pages fast and without the need to reformat the pages as images on the web pages are being painted. In one embodiment of the present invention, dimension information of the images is retrieved simultaneously with the retrieval of an HTML (hypertext markup language) document associated with the web page. Many image file formats (e.g., the GIF format) have a header which contains information on the dimension of the image. The size of this header is typically around a hundred bytes (which is much smaller than the image data itself), thus taking only a relatively short time to retrieve. Once dimension information of the image is available, space for the image can be reserved on a web page and the text following the image can be set in the right place. Thus, it is possible to display a page even though the image itself is not yet available. Consequently, the browser can format and display the page in a very short time. As image data becomes available, it can be used to paint to the reserved space without affecting the layout of the page. Consequently, the problems encountered in prior art browsers (e.g., blank screen and sudden reformatting of a page) can be avoided.

In this embodiment, a browser is used to generate a web page containing text and at least one image. The text and image are obtained over a network, such as the Internet. The web page is created from an HTML document containing HTML tags. At least one of the tags is an image tag which contains the location of an image file corresponding to the image on the web page. The image file contains image data together with dimension data relating to the dimension of the image. The browser comprises means for opening a plurality of connections over the network and means for causing the opening means to open a connection for retrieving the HTML document. A parser is used to detect image tags and for causing the opening means to open a connection to the image file in response to the present of an image tag in the HTML document. The image file is retrieved over the network and dimension data is first obtained. The browser can then reserve a window for the image and format the web page accordingly. As a result, the browser can display the formatted web page prior to receiving the image data. The browser also contains means for painting the window when the image data is retrieved.

These and other features of the present invention will be disclosed in the following description of the invention together with the accompanying drawings.

BRIEF DESCRIPTION OF THE DRAWINGS

FIG. 3A shows an example of an HTML document which can be processed by the browser of the present invention.

FIG. 3B shows the integrated document corresponding to the HTML document of FIG. 3A as it would appear on a display screen of a client computer.

DETAILED DESCRIPTION OF THE PREFERRED EMBODIMENT

The present invention is directed to a novel browser for displaying web pages. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
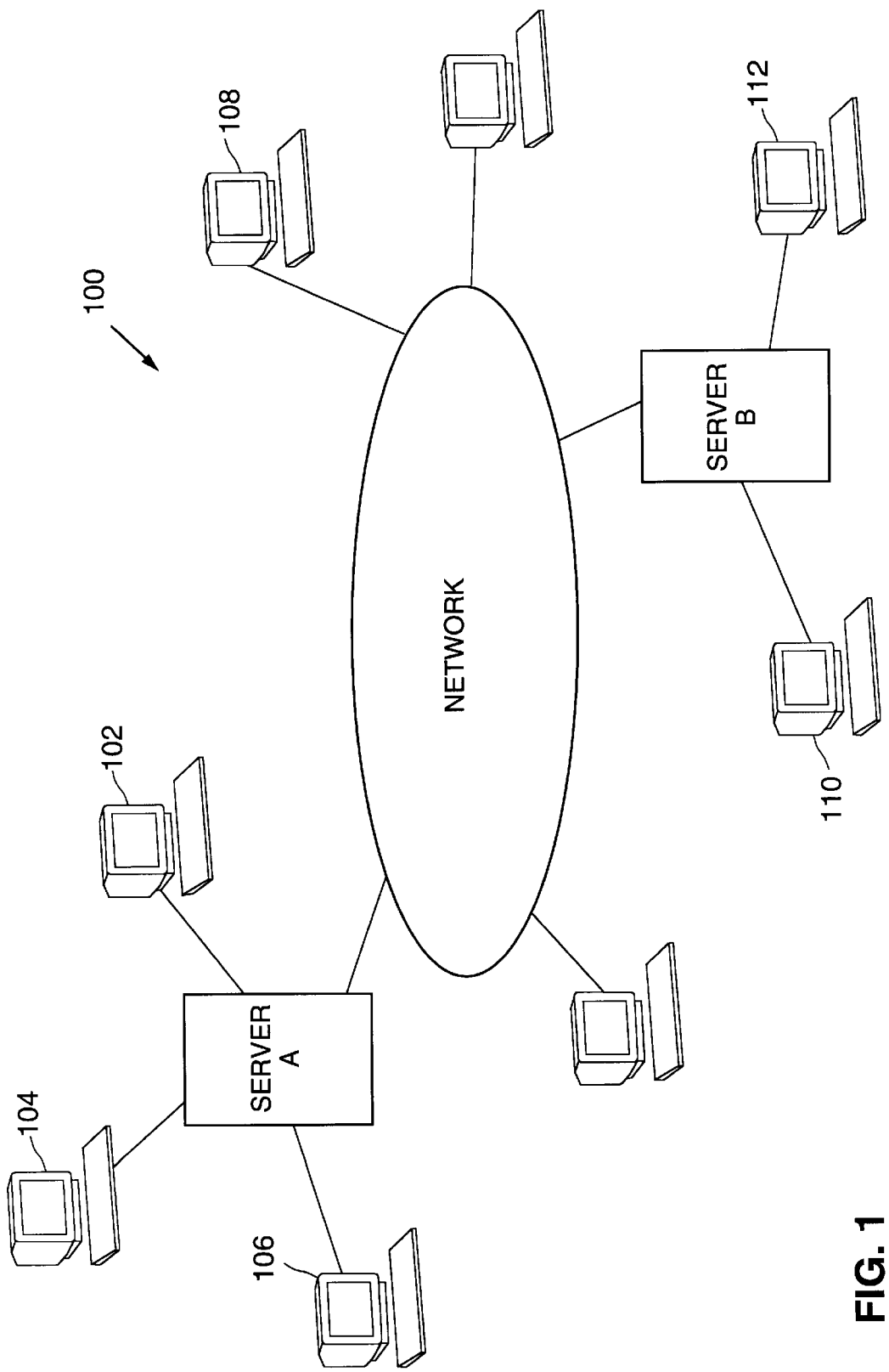
FIG. 1 is a pictorial diagram of a computer network used in the present invention.

FIG. 1 is a pictorial diagram of a computer network 100, such as the Internet. Computer network 100 comprises small computers (such as computers 102, 104, 106, 108, 110 and 112) and large computers, such as computers A and B, commonly used as servers. In general, small computers are "personal computers" or workstations and are the sites at which a human user operates the computer to make requests for data from other computers or servers on the network. Usually, the requested data resides in large computers. In this scenario, small computers are clients and the large computers are servers. In this specification, the term "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 102, may request a web page from server A. Since computer 102 is directly connected to server A this request would not result in a transfer of data over what is shown as the "network" of FIG. 1. A different request from computer 102 may be for a web page that resides in server B. In this case, the data is transferred from server B through the network to server A and, finally, to computer 102. The distance between servers A and B may be very long, e.g. across continents, or very short, e.g., within the same city. Further, in traversing the network, the data may be transferred through several intermediate servers and many routing devices, such as bridges and routers. As a result, it may take a relatively long time for data to be transferred from server B to server A.

Figure 2:
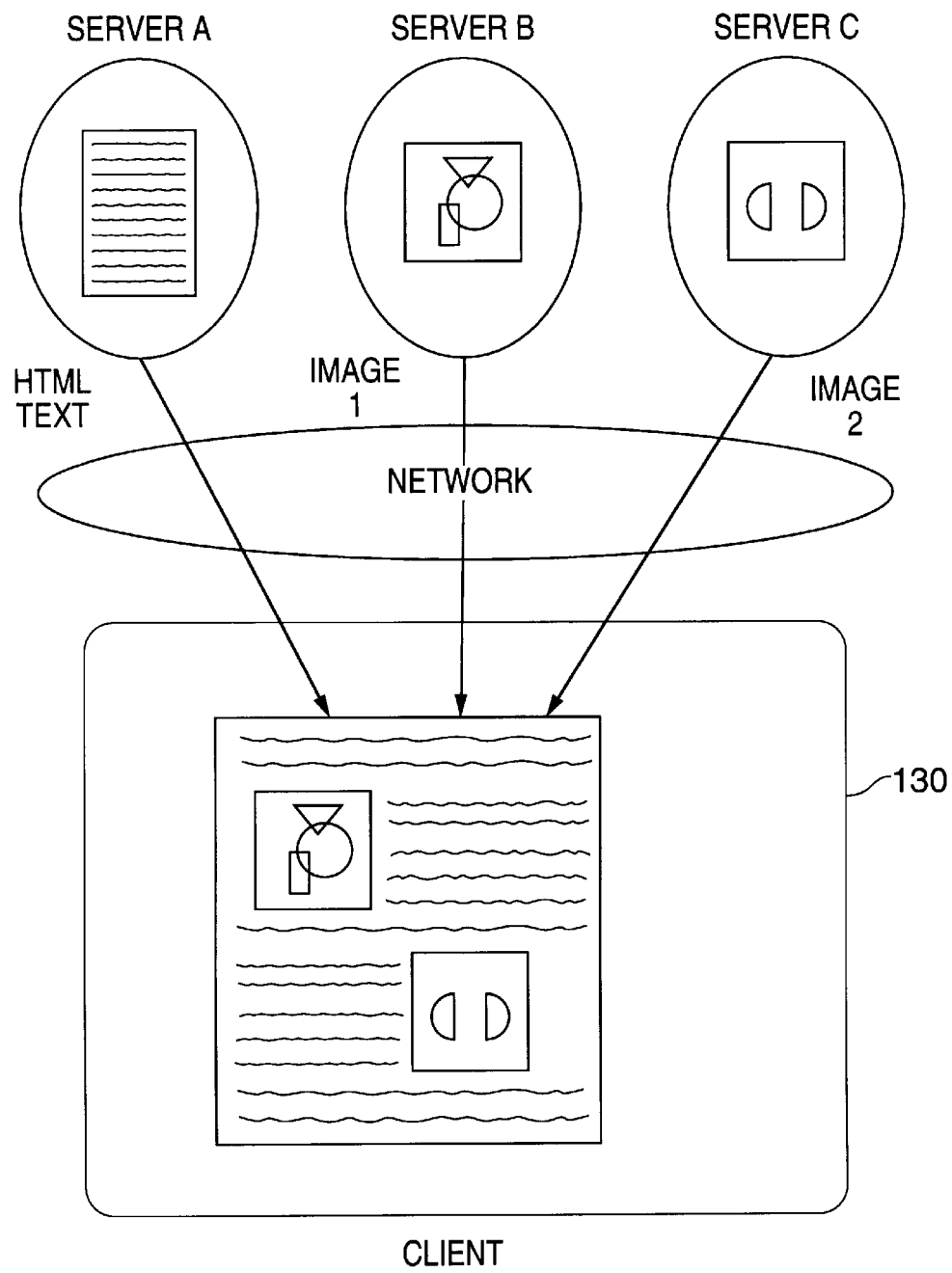
FIG. 2 illustrates the retrieval of remote text and images and their integration in a web page.

FIG. 2 illustrates the retrieval of remote text and images and their integration in a web page by a client computer 130. In FIG. 2, server A contains a text document coded in a standard Hypertext Markup Language (HTML) format. Server B contains an image file called Image 1 and server C contains another image file called Image 2. Each of these servers is remotely located from the other servers and the client 130. The transfer of data is via the Internet. It should be appreciated that the text and image files could be located in the same server which is remote from client 130.

FIG. 3A shows an example of an HTML document. FIG. 3B shows the corresponding integrated document (web page) as it would appear on a display screen of a client computer. The first line of the document in FIG. 3A reads "<title>Distributed Image Loading Example</title>." In this case, the tags <title> and </title> are HTML delimiters corresponding to the beginning and ending, respectively, of text that is designated as the title. The title could be used for various purposes, such as listing of the document in an automatically generated index. Similarly, <h1> and </h1> are HTML delimiters for a header to be displayed in a large font. In this case the software running on the client computer 130 knows to display the header at the top of the page in a larger font size than the rest of the page.

After the title and header, the HTML document of FIG. 3A contains the text "One of the major features . . . capability". At the end of the text paragraph is another HIML tag shown as <p>. This is a tag indicating the end of a paragraph.

To continue with the second paragraph of the HTML document, the text reads "This document . . . this image: <IMG align=middle src="HTTP://www.ncsa.uic.edu/demoweb/al-small.gif"> was obtained from Illinois. <p>". The text in angle brackets defines an image to be placed in the text. Specifically, the tag indicates that the image should be aligned in the middle of the current line of text and the image file is located in a server having a URL address of "HTTP://www.ncsa.uic.edu/demoweb/al-small.gif".

It can be seen from the above tag for the image file that there is no information on the dimension of the image. Consequently, a browser running on client computer 130 would not know how much space be reserved for this image on a web page. As explained above, some prior art browsers would place an icon at this location to indicate to a viewer that an image should be present in this location. However, the size of the icon would be different from the size of the actual image. The browser of the present invention places an image window having the same size as the actual image at this location.

The next paragraph in the text document of FIG. 3A shows another IMG tag. Again, the tag does not include any information on the dimension of the image.

As discussed above, the lack of dimension information of the images causes problems in formatting the document on a computer screen. One way to solve this problems is to obtain dimension information of the images simultaneously with receiving the HTML document. Many image file formats have a header which contains information on the dimension of the image. For example, the header of the Graphics Interchange Format (the "GIF" format) contains fields for the image's left position, top position, width, and height. The specification of the GIF format is publicly available on the Internet at "http://www.w3.org/hypertext/WWW/Graphics/GIF/spec-gif89a.txt". The size of this header is typically around a hundred bytes (versus more than ten thousand bytes of compressed data for the image itself), thus taking only a relatively short time to retrieve and process. Once dimension information of the image is available, space for the image can be reserved on a web page and the text following the image can be set in the right place. Thus, it is possible to format a page even though the image itself is not yet available. This means that the client computer can display the page in a very short time. As the image becomes available, it can be painted to the reserved space without affecting the layout of the page. Consequently, the problems encountered in prior art browsers (e.g., blank screen and sudden reformatting of a page) can be avoided.

Figure 4:
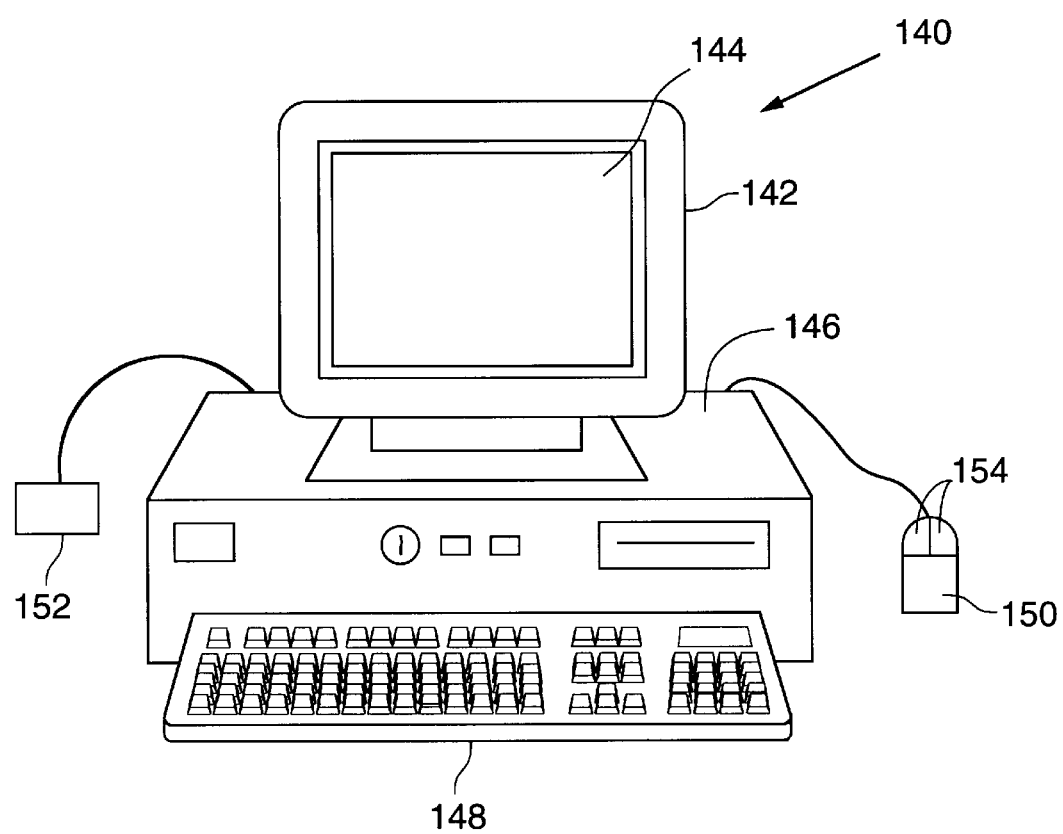
FIG. 4 shows a computer system that could be used to run the browser of the present invention.

Typically, a browser runs on top of an operating system of a client computer system. A computer system 140 that could be used to run the browser of the present invention is shown in FIG. 4. It includes a display device 142 (such as a monitor), a display screen 144, a cabinet 146 (which encloses components typically found in a computer, such as CPU, RAM, ROM, video card, hard drive, sound card, serial ports, etc.), a keyboard 148, a mouse 150, and a modem 152. Mouse 150 has one or more buttons, such as buttons 154. Modem 152 allows computer system 140 to be connected to the Internet using a phone line.

An operating system is a software which controls the resource of a computer system. One of the jobs of an operating system is to provide application programs with an user interface. The browser of the present invention preferably uses the user interface provided by the operating system. Examples of operating systems are MSDOS and Windows in an IBM compatible computer and System 7 in a Macintosh computer.

Figure 5:
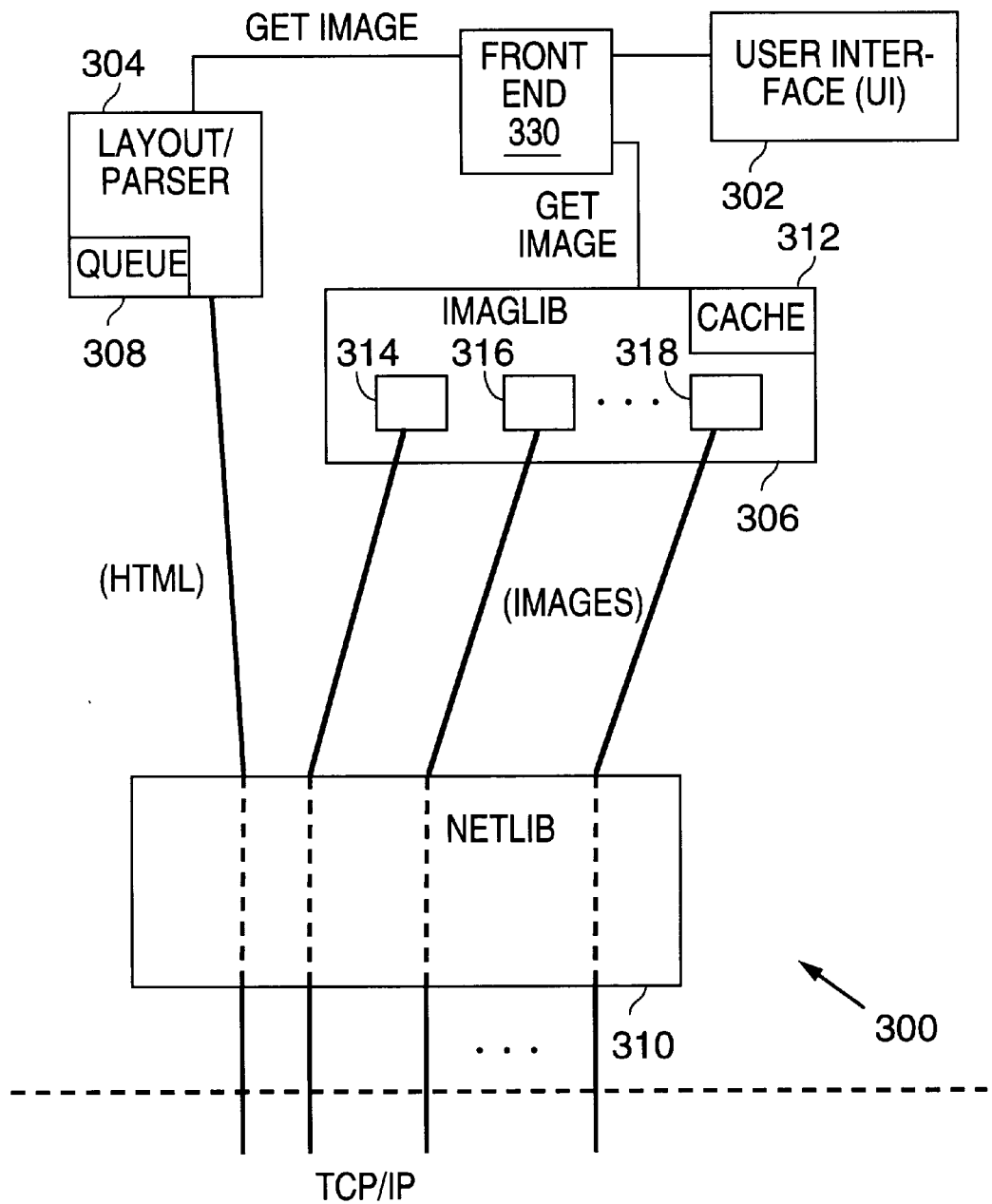
FIG. 5 is a block diagram of a web browser of the present invention.

FIG. 5 is a block diagram of a web browser 300 of the present invention which can be run on a computer, such as computer system 140 of FIG. 2. Web browser 300 includes an user interface (UI) 302, which is typically provided by the operating system of the client computer. Web browser 300 also includes a layout/parser module 304 which directs UI 302, through a front end (FE) 330, to setup a web page on display screen 144 of computer system 140. In addition, browser 300 includes an IMAGLIB 306 which communicates with FE 330. IMAGLIB 306 is responsible for managing images. Both layout/parser module 304 and IMAGLIB 306 are connected to a NETLIB 310, which manages the connection of browser 300 to the Internet.

Some of the functions performed by module 304 are: (a) receiving and processing HTML documents, (b) directing FE 330 to request IMAGLIB 306 (and NETLIB 310) to open connections to image servers by issuing "get image" commands to FE 330, (c) obtaining dimension information of images by issuing "get size" commands to FE 330, (d) reserving windows on a web page for images after their dimensions have been determined, and (e) formatting web pages. Layout/parser module 304 does not handle the painting of the actual images. This job is handled by FE 330 in response to calls from IMAGLIB 306.

FE 330 preferably communicates with UI 302 via the UI's API (application program interface). Thus, FE 330 sends a sequence of API commands to UI 302 for displaying the text and image windows on display screen 144. When the actual images are retrieved by IMAGLIB 306, FE 330 paints them into the windows reserved by layout/parser module 304. The format of the web page generated by module 304 remains the same as images are retrieved by IMAGLIB module 306 and painted by FE 330. As a result, the web page does not need to be reformatted as the actual images appear on the computer screen.

Figure 6:
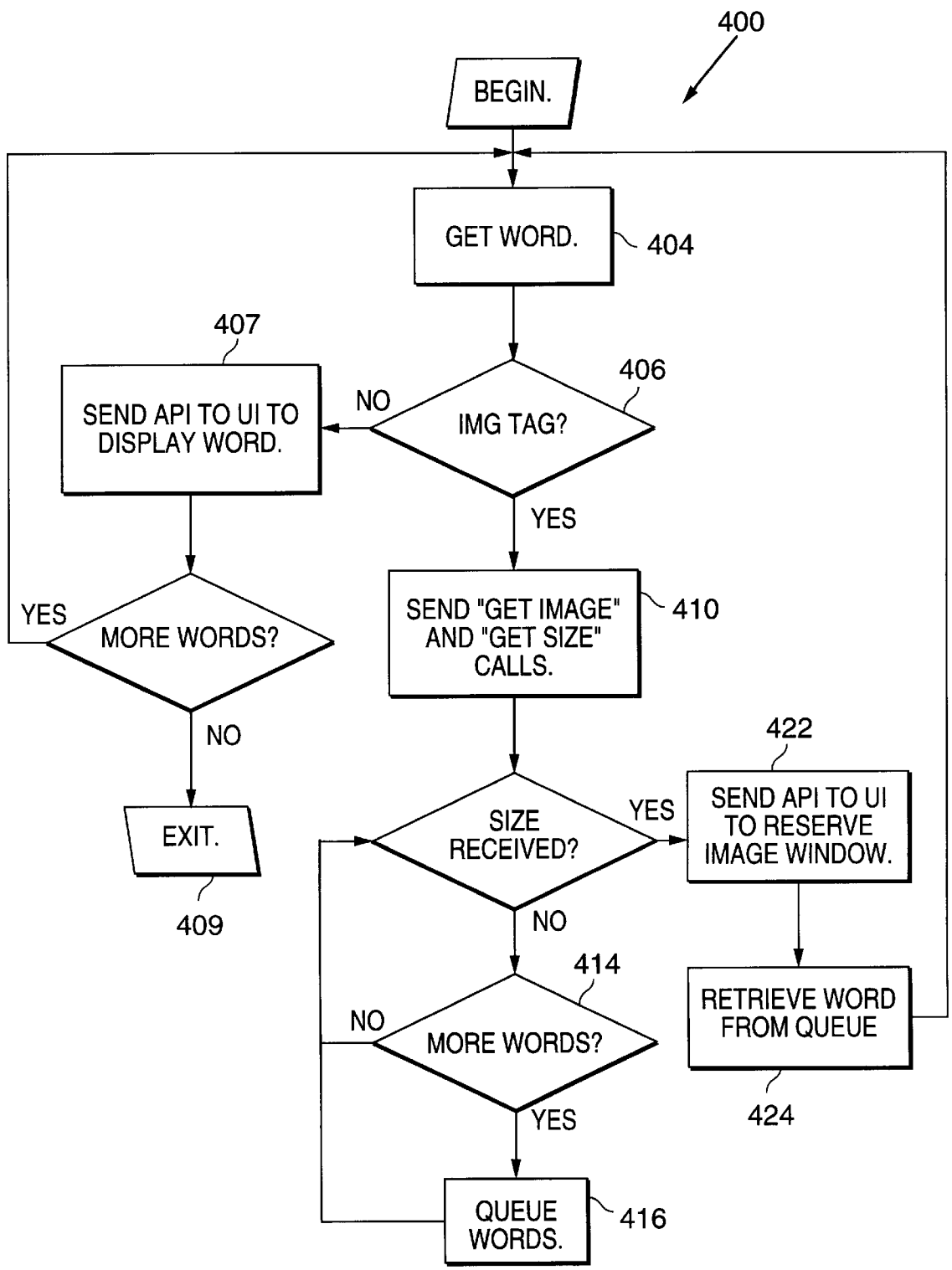
FIG. 6 is a flow chart showing the operation of a layout-parser module of the present invention.

The operation of layout/parser module 304 is discussed in more detail in flow chart 400 of FIG. 6. Layout/parser module 304 receives words in an HTML document from an Internet server through a NETLIB 310 (step 404). Module 304 looks for image tags in the HTML document (step 406). When the words do not correspond to an image tag, module 304 causes UI 302 to display the words in accordance with the tags embedded in the HTML document, e.g., page header, paragraph, etc. (step 407). If there is no more words to be processed, flow chart 400 terminates (step 409).

When an image tag is detected, module 304 issues a "get image" call to FE 330 (with the appropriate URL address) requesting it to cause a connection to the corresponding image server be opened. Module 304 also issues a "get size" call to FE 330 to obtain the dimension of the image on a web page (step 410). Before the dimension information is received, module 304 continues to receive and parse the HTML document (step 414). At this point, both IMAGLIB 306 and module 304 are simultaneously receiving and processing information. The words of the HTML document are put in a queue (shown as reference numeral 308 in FIG. 5) for later processing (step 416). As a result, the text and images of an HTML document can be processed simultaneously by browser 400. By requesting image information at the earliest possible time (i.e., at the first instance a image tag is recognized), it is possible to shorten the time a web page is displayed.

When FE 330 returns the dimension of an image file to layout/parser module 304, module 304 causes FE 330 to send API commands to UI 302 to reserve an image window (step 422). The words stored in queue 308 is retrieved (step 424). Flow chart 400 goes to step 404. At this time, the words being processed are the words in the queue. Flow chart 400 terminates until all the words in the HTML document (i.e., words in the queue and any additional words in the rest of the HTML document) are processed.

The operation of IMAGLIB 306 is now described. Referring now to FIG. 5, when IMAGLIB 306 receives the "get image" call from FE 330, it checks to see if the image is already stored in its internal cache 312. If cache 312 contains the image, IMAGLIB 306 can immediately return appropriate information to FE 330. If the image is not stored in cache 312, IMAGLIB 306 creates a state machine 314 to process this image. State machine 314 issues a GetURL request to NETLIB 310. NETLIB 310 opens a connection in response to this request. Data stream received by NETLIB 310 from the connection is sent to state machine 314. State machine 314 retrieves dimension information from the header file of the desired image and issues a command to FE 330. This command causes FE 330 to inform layout/parser module 304 of the image size. State machine 314 also causes FE 330 to draw (via UI 302) the arriving image on the screen using UI 302.

If an HTML document contains multiple image tags, IMAGLIB module 306 will create multiple state machines, such as 316 and 318, to simultaneously process image information in the same manner as described above for state machine 314. Because each state machine returns header information to FE 330, and thus to layout/parser module 304, as soon as possible, module 304 can generate a web page faster than prior art browsers.

NETLIB 310 is responsible for managing connections to the Internet. Both FE 330 and IMAGLIB 306 can issue "get URL" commands to NETLIB 310. When NETLIB 310 receives a "get URL" command, it opens a connection with a server in accordance with the address indicated in the URL. FE 330 can issue a "process net" command to NETLIB 310, which causes NETLIB 310 to process data in the connections. This command contains a parameter which indicates which connection should be processed. The value of this parameter is rotated sequentially so that all the connections receive attention of the CPU. Thus, the "process net" command serves as a kind of time-division multiplexer for controlling the processing of data in each connection by NETLIB 310.

As mentioned above, FE module 330 can receive commands from IMAGLIB 306. FE module 300 can also communicate with UI 302. For example, a viewer can type in a host name on keyboard 148 of computer 140. UI 302 sends the host name to FE module 330, which then issues a "get URL" command to NETLIB 310 for opening a connection.

FE module 330 allows a viewer to type in a host name and it can supply the complete URL address to locate the corresponding file from a remote server. For example, when a viewer types in "www.foo.com", FE module 330 causes NETLIB 310 to open a connection using the following URL name: "http://www.foo.com/". Similarly, when a viewer types in "ftp.foo.com", "news.foo.com", or "gopher.foo.com", FE module 330 causes NETLIB 310 to a open a connection using "ftp://ftp.foo.com", "news://news.foo.com/*", or "gopher://gopher.foo.com/", respectively. This feature reduces the amount of typing by a viewer, thereby making the browser easier to use.

In one embodiment of the present invention, NETLIB 310 is implemented as a state machine having an associated connection structure. The connection structure has memory locations for containing the states of each connection. A variety of network protocols, such as FTP, GOPHER, etc, are supported. Each connection retrieves state variables from and stores state variables in the connection structure. NETLIB 310 also contains codes which can handle TCP/IP protocol used by the Internet.

A variety of methods could be used to simultaneously retrieve data from multiple servers. In one embodiment, multiple TCP connections can be opened and read in an interleaved fashion. In another embodiment, application layer multiplexing methods can be used.

In order to further improve the performance of the browser of the present invention, NETLIB 310 can process data using a priority system. NETLIB 310 first determines the connections which have received data from the remote servers. Only those connections containing received data will deliver the data to the corresponding recipients (i.e., layout/parser module 304 and/or the state machines in IMAGLIB 306). NETLIB 310 continuously services these connections one at a time. By changing the number of bytes delivered to a recipient during each service, a priority system is set up. The number of bytes delivered to a recipient in each service is determined by the following algorithm:

(a) If the recipient is (i) layout/parser module 304 or (ii) the state machine in IMAGLIB 306 which is waiting for the header information of an image file, NETLIB 310 will deliver data to the recipients in units of 128 bytes. This will ensure that the required information be delivered to the recipient almost as soon as they are received.

(b) If the recipient is a state machine in IMAGLIB 306 which corresponds to an image currently displaying on the client computer, NETLIB 310 will deliver data to the recipient in units of 2048 bytes. This will ensure that a large amount of image data be delivered to the image window. As a result, the image can be painted quickly.

(c) If the recipient is a state machine in MAGLIB 306 which corresponds to an image not currently being displayed on the client computer, NETLIB 310 will deliver data to the recipient in units of 512 bytes.

It should be appreciated that the exact number of bytes and the level of priority described above are illustrative. The basic idea is that the priority of different recipients (e.g., text, images displaying on a computer screen, and non-displaying images) can be determined by assigning different number of bytes in each delivery.

The above described method relies on the availability of dimension information in the header of graphic files to solve the problem that HTML documents do not contain such information. Another solution to the problem is to embed such information in HTML documents themselves. In this way, layout/parser module 304 can format a web page before opening connections to image servers. For example, it is possible to add the following extension to the HTML:

<IMG WIDTH=value1 HEIGHT=value2>.

This new tag specifies the width and height of an image on a web page. Thus, a web page can be formatted using this new tag and without having to wait for the header of the image file to be retrieved over the network. The technical specification of an extension to HTML which includes this tag is shown in an Appendix to the present patent application. This specification is incorporated herein by reference.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

APPENDEX

Extensions to HTML

These are proposed extensions to tne soon to be released HIMT 2.0 specification. Netscape Communications will be working with the appropriate standards bodies, including W3O. and the authors of other WWW browsers in an attempt to have these extensions available in all browsers in the near future. All the Netscape Navigator extensions to HTML take the form of additional tags and attributes added to the HTML specification and are specifically designed not to break existing WWW browsers.

<ISINDEX>

To the ISINDEX element we have added the PROMPT tag. ISINDEX indicates that a document is a searchable index. PROMPT has been added so the document author can specify what message they want to appear before the text input field of the index. The default is of course that unfortunate message:

This is a searchable index. Enter search keywords:

<HR>

The HR element specifies that a horizontal rule of some sort (The default being a shaded engraved line) be drawn across the page. To this element we have added 4 new tags to allow the documents author some ability to describe how the horizontal rule should look.

<HR SIZE=number>

The SIZE tag lets the author give an indication of how thick they wish the horizontal rule to be.

APPENDEX-continued

<HR WIDTH=number|percent>

The default horizontal rule is always as wide as the page. With the WIDTH tag, the author can specify an exact width in pixels. or a relative width measured in percent of document width.
<HR ALIGN=left|right|center>

Now that horizontal rules do not have to be the width of the page we need to allow the author to specify whether they should be pushed up against the left margin, the right margin, or centered in the page.
<HR NOSHADE>

Finally, for those times when you really want a solid bar, the NOSHADE tag lets you specify that you do not want any fancy shading of your horizontal rule.
<UL>

Your basic bulleted list has a default progression of bullet types that changes as you move through indented levels. From a solid disc, to a circle to a square. We have added a TYPE tag to the UL element so no matter what your indent level you can specify whether you want a TYPE=disc, TYPE=circle, or TYPE=square as your bullet.
<OL>

Your average ordered list counts 1, 2, 3, . . . etc. We have also added the TYPE tag to this element to allow authors to specify whether the want their list items marked with: capital letters (TYPE=A), small letters (TYPE=a), large roman numerals (TYPE=I), small roman numerals (TYPE=i), or the default numbers (TYPE=1).
For lists that wish to start at values other than 1 we have the new tag START. START is always specified in the default numbers. and will be converted based on TYPE before display. Thus START=5 would display either an 'E', 'e', 'V', 'v', or '5' based on the TYPE tag.
<LI>

To give even more flexibility to lists, we thought it would be nice if the author could change the list type, and for ordered lists the list count index as they progressed. To this end we added the TYPE tag to the LI element as well. It takes the same values as either UL or OL depending on the type of list you are in, and it changes the list type for that item, and all subsequent items. For ordered lists we have also added the VALUE element so you can change the count, for that list item and all subsequent.
<IMG>

The IMG tag is probably the most extended tag.
<IMG ALIGN=left|right|top|texttop|middle|absmiddle|baseline|bottom|abs.>

The additions to your ALIGN options needs a lot of expianation. First, the values "left" and "right". Images with those alignments are an entirely new floating image type. A ALIGN=left image will float down and over to the left mrgin (into the next avallable space there), and subsequent text will wrap around the right hand side of that image. Likewise for ALIGN=right the image aligns with the right margin, and the text wraps around the left.
The rest of the align options are my way of trying to correct for the horrible errors I made when first implementing the IMG tag, without destroying the look of existing documents. ALIGN=top does just what it always did which is align itself with the top of the tallest item in the line. ALIGN=texttop does what many people thought top should do which is align itself with the top of the tallest text in the line (this is usually but not always the same as ALIGN=top). ALIGN=middle does just what it always did, it aligns the baseline of the current line with the middle of the image. ALIGN=absmiddle does what middle should have done which is align the middle of the current line with the middle of the image.
ALIGN=baseline aligns the bottom of the image with the baseline of the current line. ALIGN=bottom does just what it always did (which is identical to ALIGN=baseline but baseline is a better name). ALIGN=absbottom does what bottom should have done which is align the bottom of the image with the bottom of the current line.
<IMG WIDTH=value HEIGHT=value>

The WIDTH and HEIGHT tags were added to IMG mainly to speed up display of the document. If the author specifies these, the viewer of their document will not have to wait for the image to be loaded over the network and its size calculated.
<IMG BORDER=value>

This lets the document author control the thickness of the border around an image displayed. Warning: setting BORDER=0 on images that are also part of anchors may confuse your users as they are used to a colored border indicating an image is an anchor.
<IMG VSPACE=value HSPACE=value>

For the floating images it is likely that the author does not want them pressing up against the text wrapped around the image. VSPACE controls the vertical space above and below the image, while HSPACE controls the horizontal space to the left and right of the image.
<BR>

With the addition of floating images, we needed to expand the BR tag. Normal BR still just inserts a line break. We have added a CLEAR tag to BR. so CLEAR=left will break the line, and move vertically down until you have a clear left margin (no floating images). CLEAR=right does the same for the right margin, and CLEAR=all moves down until both margins are clear of images.

APPENDEX-continued

New Elements

<NOBR>

The NOBR element stands for NO BReak. This means all the text between the start and end of the NOBR elements cannot have line breaks inserted between them. While NOBR is essential for those odd character sequences you really don't want broken, please be careful; long text strings inside of NOBR elements can look rather odd.
<WBR>

The WBR element stands for Word BReak. This is for the very rare case when you have a NOBR section and you know exactly where you want it to break. Also, any time you want to give the Netscape Navigator help by telling it where a word is allowed to be broken. The WBR element does not force a line break (BR does that) it simply lets the Netscape Navigator know where a line break is allowed to be inserted if needed.
<FONT SIZE=value>

Surprise! You can change the font size. Values range from 1–7. The default font size is 3.
The value given to size can optionally have a '+' or '−' character in front of it to specify that it is relative the the document basefont. The default basefont is 3, and can be changed with the BASEFONT element.
<BASEFONT SIZE=value>

This changes the size of the BASEFONT that all relative font changes are based on. It defaults to 3, and has a valid range of 1–7.
<CENTER>

You aren't dreaming, yes you can center your text. All lines of text between the begin and end of CENTER are centered hetween the current left and right margins. A new tag has been introduced rather than using the proposed <P Align="center"> because using <P Align="center"> breaks many existing browsers when the <P> tag is used as a container. The <P Align="center"> tag is also less general and does not support all cases where centering may be desired.

Behavioral Changes

Font attributes are now properly cumulative. Text inside something like
<i><tt><font size=6><b>Text here</b></font></tt></i>
will be italic fixed bold text of size 6.
The Netscape Navigator should now properly deal with the awful HTML comment sequence. This should be:
<!- Comment here ->
These comments can include other elements, and thus be used to quickly comment out large chunks of markup.
Line breaking is a little more under control now. Unless specified with a formatting element, lines can only be broken where empty space occurs in the original document. This means any spaces, tabs, or newlines. You should never again have the sequence <A HREF=url>Anchor here</A>, broken between the highlighted anchor and the period.

New Entities

In addition to the usual & escaped entities:
&reg; -> Registered Trademark -> ®
&copy; ->Copyright -> 201

What is claimed is:

1. A browser for accessing a remote server over a network, said server having a URL containing a protocol portion and a server portion, said browser comprising:

a user interface for allowing a viewer to type in said server portion, wherein said typed-in server portion is one of a plurality of possible server portions, each possible server portion having a corresponding protocol portion that is one of a plurality of protocol portions;

means responsive to said typed-in server portion for determining which of the plurality of protocol portions corresponds to said typed-in server portion;

means for generating a complete URL by attaching said determined protocol portion to said typed-in server portion; and means for opening a connection with said remote server using said URL generated by said means for generating.

2. A browser for accessing a remote server over a network, said server having a URL containing a protocol portion and a server portion, said browser comprising:

a user interface for allowing a viewer to enter said server portion, wherein said entered server portion is one of a plurality of possible server portions and each possible server portion has a corresponding protocol portion that is one of a plurality of protocol portions;

means responsive to the entered server portion for determining which of the plurality of protocol portions corresponds to the entered server portion;

means for generating a complete URL by attaching said determined protocol portion to said server portion entered by the viewer; and means for opening a connection with said remote server using said URL generated by said means for generating.

3. A method of accessing a remote server over a network using a browser, said server having a URL associated therewith that contains a protocol portion and a server portion, wherein said server portion is one of a plurality of possible server portions and each possible server portion has a corresponding protocol portion that is one of a plurality of protocol portions, said method including:

responsive to a server portion entered by a viewer via a user interface of the browser, determining which of the plurality of protocol portions corresponds to the entered server portion;

generating a complete URL by attaching said determined protocol portion to said entered server portion; and opening a connection with said remote server using said URL generated in said generating step.

4. A method of accessing a remote server over a network using a browser, said server having a URL associated therewith that contains a protocol portion and a server portion, said method including:

entering a server portion by a viewer via a user interface to the browser, wherein said entered server portion is one of a plurality of possible server portions, each possible server portion having a corresponding protocol portion that is one of a plurality of protocol portions;

responsive to said typed-in server portion, determining which of the plurality of protocol portions corresponds to the entered server portion;

generating a complete URL by attaching said determined protocol portion to said entered server portion; and opening a connection with said remote server using said URL generated in said generating step.

* * * * *